3,336,326
NOVEL IMIDAZOLE CARBOXAMIDES
Erik Fred Godefroi, Turnhout, and Cyriel Alphons Maria Van Der Eycken, Vosselaar, near Turnhout, Belgium, assignors to Janssen Pharmaceutica, N.V., a corporation of Belgium
No Drawing. Filed Apr. 16, 1964, Ser. No. 360,444
19 Claims. (Cl. 260—295)

This invention relates to a new series of organic compounds. More particularly, it is concerned with certain 1-(1-phenyl-ethyl)-5-[(R)(Ar)N-CO]-imidazoles, which may be represented by the formula:

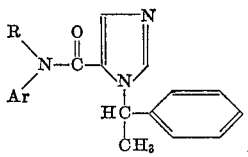

wherein R is a member selected from the group consisting of hydrogen and lower alkyl; and Ar is a member selected from the group consisting of phenyl, halophenyl, lower alkylphenyl, lower alkoxyphenyl, nitrophenyl and pyridyl. Said halophenyl, lower alkylphenyl, lower alkoxyphenyl and nitrophenyl may be mono- or poly-substituted with respect to their halo, lower alkyl, lower alkoxy and nitro components.

The foregoing compounds have useful pharmacological properties, for example, they are potent ataxia inducing anti-convulsants and sedatives. At low dose levels, they antagonize convulsions induced by strychnine pentylenetetrazol and electroshock.

As used herein, lower alkyl and lower alkoxy have from 1 to 5 carbon atoms, including straight or branched saturated aliphatic chains, such as, for example, methyl, ethyl, propyl, isopropyl, butyl, isobutyl, tertiary-butyl, pentyl and the like, and the respective methoxy, ethoxy, propoxy, isopropoxy, butoxy, etc.; and halo includes chlorine, bromine, fluorine and iodine.

The compounds of this invention may be prepared by reacting an imidazole carboxylic acid halide, such as 1 - (1 - phenyl-ethyl)-5-(halo-carbonyl)-imidazole, which may be represented by the formula:

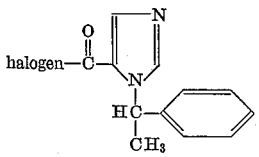

wherein the preferred halogen is chlorine, with an appropriately selected amine of the formula:

wherein R and Ar are as previously defined. Preferably, the imidazole carboxylic acid halide is used in the form of a hydrohalide salt, e.g., the hydrochloride. The reaction can be carried out in an inert organic solvent such as an aromatic hydrocarbon, e.g., benzene, toluene, xylene and the like and, preferably, in the presence of a halogen acid acceptor to bind the halogen acid that is liberated during the course of the reaction. Typical halogen acid acceptors are the organic tertiary amines such as the trialkylamines, e.g., triethylamine, tributylamine, etc.; heterocyclic amines, e.g., N-alkyl piperidine, pyridine, etc.; and dialkyl aromatic amines, e.g., diethyl aniline, dimethyl aniline, etc. Preferably, the reaction is carried out in a liquid amine such as pyridine which is capable of acting as both solvent and halogen acid acceptor. The reaction may be usefully accelerated by elevated temperatures.

The organic bases of this invention form pharmaceutically acceptable salts according to conventional techniques with a variety of inorganic and strong organic acids, including sulfuric, phosphoric, hydrochloric, hydriodic, sulfamic, citric, lactic, maleic, malic, succinic, tartaric, cinnamic, acetic, benzoic, gluconic, ascorbic, and the like acids.

The following examples are intended to illustrate, but not to limit, the scope of the present invention. Unless otherwise stated, all parts are by weight.

EXAMPLE I

To a mixture of 132 parts dl-1-phenyl-ethylamine, 110 parts triethylamine and 100 parts dimethylformamide, are added 133.5 parts ethyl chloroacetate (exothermic reaction: temperature rises from 10° to 50° C.). After the addition is complete, the whole is stirred overnight at a temperature of 45° C. The reaction mixture is then diluted with 800 parts anhydrous ether, whereupon a precipitate is formed. It is filtered off (mainly triethylamine hydrochloride) and the filtrate is washed four times with water. The organic layer is dried over magnesium sulfate, filtered and evaporated, yielding dl-N-[(ethoxycarbonyl)-methyl]-1-phenyl ethylamine as a residue. This product is heated to reflux together with 55.2 parts formic acid and 480 parts xylene. After the calculated amount of water and formic acid are separated, the mixture is cooled and extracted successively with water, formic acid 20%, water, a sodium hydrogen carbonate solution and again with water. The organic layer is then separated, dried over magnesium sulfate, filtered and evaporated. The oily residue is distilled in vacuo, to yield dl-N-formyl-N-[(ethoxycarbonyl)-methyl]-1-phenyl-ethylamine (B.P. 165–170° C. at 3 mm. pressure). 29.9 parts of a sodium dispersion 50% in paraffin oil are added to 300 parts tetrahydrofurane and the whole is slowly heated to a temperature of 40° C. while stirring. While maintaining this temperature, there is added a solution of 16 parts methanol and 75 parts tetrahydrofurane. After the addition is complete, the whole is stirred at 40° C. for 1 hour. After cooling to 10° C., there is added at once a mixture of 144 parts dl-N-formyl-N-[(ethoxycarbonyl)-methyl]-1-phenyl ethylamine (see above) in 108 parts methyl formate. The whole is stirred overnight at room temperature. The mixture is evaporated in vacuo. To the residue are added 800 parts ether followed by 700 parts water. The aqueous layer is separated and diluted to a volume of 1000 parts. Then there are added 114 parts concentrated hydrochloric acid. The whole is heated to 40° C. and stirred at this temperature for 15 minutes. Then there is added dropwise a solution of 90 parts potassium thiocyanate in an equal volume of water. After the addition is complete the whole is further stirred for 3 hours at 40° C., followed by stirring overnight at room temperature. The methanol is distilled off and the oily residue solidifies on stirring. This solid is triturated in ice-cold methanol previously diluted with 15% water. The solid is filtered off, washed with diisopropylether and recrystallized once more from a mixture of methanol and water, treated with activated charcoal. After boiling for a few minutes, the whole is filtered hot and after cooling the filtrate for 3 hours at room temperature, the solid is filtered off yielding dl-1-(1-phenyl-ethyl)-2-mercapto-5-(methoxy-carbonyl)-imidazole, M.P. 131–134° C.

EXAMPLE II

To a mixture of 80 parts nitric acid and 200 parts water are added 0.5 part sodium nitrite at a temperature of about 25° C. While keeping the temperature at about 35° C. there are added portionwise 66 parts dl-1-(1-phenylethyl)-2-mercapto-5-(methoxy-carbonyl)-imidazole. After the addition is complete, the whole is cooled to room temperature. Then the solution is alkalized by addition of sodium carbonate while stirring. The mixture is extracted with ether. The organic layer is separated, dried over magnesium sulfate and filtered. To the filtrate is added 2-propanol, previously saturated with gaseous hydrogen chloride. The formed precipitate is filtered off and dissolved in boiling methanol. Anhydrous ether is added until a turbid solution is obtained and the whole is kept overnight at room temperature. Then the precipitate is filtered off and dried in vacuo, yielding dl-1-(1-phenyl-ethyl) - 5 - (methoxy - carbonyl) - imidazole hydrochloride; M.P. 173–174° C.

EXAMPLE III

A mixture of 58 parts dl - 1 - (1 - phenyl - ethyl)- 5 - (methoxy - carbonyl) - imidazole hydrochloride and 557 parts concentrated hydrochloric acid is stirred and refluxed overnight. The reaction mixture is boiled with activated charcoal. The mixture is filtered and the filtrate is evaporated. The solid residue is washed with acetone and filtered off again. This product is dissolved in a small volume of water and the solution is alkalized with a concentrated sodium hydroxide solution, pH: ±7. The precipitate is washed with water, dried and recrystallized from 25 parts water. After keeping for 4 hours at room temperature, the solid is filtered off, washed with alcohol and ether, and dried in vacuo, yielding dl - 1 - (1 - phenyl-ethyl) - 5 - carboxy - imidazole; M.P. 187–189° C.

EXAMPLE IV

A mixture of 64 parts dl - 1 - (1 - phenyl - ethyl) - 5-carboxy-imidazole and 240 parts thionylchloride is stirred and refluxed for about 2 hours. After cooling there are added 500 parts diisopropylether, whereupon a solid precipitate is formed. It is filtered off and dried, yielding dl-1 - (1 - phenyl - ethyl) - 5 - (chloro - carbonyl) - imidazole hydrochloride; M.P. 161→263° C. (dec.).

EXAMPLE V

To a solution of 3 parts aniline in 28 parts pyridine are added 8.1 parts dl - 1 - (1 - phenyl - ethyl) - 5-(chloro - carbonyl) - imidazole hydrochloride while stirring. The whole is stirred and refluxed for about 5 minutes. After standing for a few minutes the reaction mixture is poured into 500 parts water, whereupon an oil is separated which solidifies on scratching. This solid is filtered off and recrystallized from a mixture of benzene and petroleum ether, yielding dl - 1 - (1 - phenyl - ethyl)- 5 - (anilino - carbonyl) - imidazole; M.P. 157.5–158° C.

EXAMPLE VI

To a solution of 2.5 parts 4-fluoro-aniline in 20 parts pyridine is added 5.44 parts dl - 1 - (1 - phenyl - ethyl)- 5 - (chloro - carbonyl) - imidazole hydrochloride. The mixture is brought to a quick boil (30 seconds), allowed to sit for 5 minutes and then poured onto ice-water. Upon crystallization, it is filtered off, yielding crude dl - 1 - (1-phenyl - ethyl) - 5 - (4 - fluoro - anilino - carbonyl)-imidazole. This crop is recrystallized from a mixture of 40 parts toluene and 24 parts petroleum ether, yielding dl - 1 - (1 - phenyl - ethyl) - 5 - (4 - fluoro - anilino-carbonyl) - imidazole; M.P. 116–118° C.

EXAMPLE VII

To a solution of 3 parts 2-chloro-aniline in 20 parts pyridine are added 5.44 parts dl - 1 - (1 - phenyl - ethyl)- 5 - (chloro - carbonyl) - imidazole hydrochloride. The mixture is brought to a quick boil (30 seconds), allowed to sit for 5 minutes and then poured onto ice-water, yielding an oil. To this oil is added fresh ether, whereupon a crystalline product is obtained. It is filtered off and recrystallized from a mixture of 16 parts benzene and 40 parts petroleum ether, yielding dl - 1 - (1 - phenyl-ethyl) - 5 - (2 - chloro - anilino - carbonyl) - imidazole; M.P. 106–108.5° C.

EXAMPLE VIII

To a solution of 3 parts 3-chloro-aniline in 18 parts dry pyridine are added portionwise 5.4 parts dl - 1 - (1-phenyl - ethyl) - 5 - (chloro - carbonyl) - imidazole hydrochloride (exothermic reaction: temperature rises to about 45° C.). After the addition is complete, the mixture is brought to a quick boil and then allowed to stand for 5 minutes. The mixture is poured onto 100 parts ice-water, whereupon an oil is precipitated which crystallizes on standing. It is filtered off and recrystallized from a mixture of 24 parts benzene and 60 parts petroleum ether, yielding, after drying for 18 hours at 100° C., dl - 1 - (1-phenyl - ethyl) - 5 - (3 - chloro - anilino - carbonyl)-imidazole; M.P. 117–121° C. (dec.).

EXAMPLE IX

A mixture of 5 parts dl - 1 - (1 - phenyl - ethyl) - 5-carboxy - imidazole and 80 parts thionylchloride is stirred and refluxed for 1 hour and 30 minutes. The excess thionylchloride is evaporated and the residue is poured into 70 parts anhydrous ether. The formed precipitate is filtered off, washed several times with anhydrous ether and dried, yielding dl - 1 - (1 - phenyl - ethyl) - 5-(chloro - carbonyl) - imidazole hydrochloride. This product is added to a boiling mixture of 10 parts 4-chloro-aniline and a small volume of dimethylformamide. The whole is stirred and refluxed for one minute. After cooling there is added anhydrous ether, whereupon an oil is precipitated. The solvent is decanted. The oily residue is poured into water and solidifies on scratching. The solid is filtered off and recrystallized from warm alcohol. After heating to the boiling point, there is added water until a turbid solution is obtained. After keeping for 3 hours at room temperature, the solid is filtered off and dried, yielding dl - 1 - (1 - phenyl - ethyl) - 5 - (4 - chloro-anilino - carbonyl) - imidazole; M.P. 171–172° C.

EXAMPLE X

To a solution of 4.3 parts 3,4-dichloro-aniline in 28 parts dry pyridine are added 8 parts dl - 1 - (1 - phenyl-ethyl) - 5 - (chloro - carbonyl) - imidazole hydrochloride while stirring; (exothermic reaction). After the addition is complete, the whole is heated to reflux temperature and kept at this temperature for 5 minutes. After standing for an additional 5 minutes, the reaction mixture is poured onto ice-water. The separated oil solidifies on scratching. The solid is filtered off and recrystallized from a mixture of methanol and water, yielding dl - 1 - (1-phenyl - ethyl) - 5 - (3,4 - dichloro - anilino - carbonyl)-imidazole; M.P. 151–151.5° C.

EXAMPLE XI

To a solution of 4.3 parts 2,5-dichloro-aniline in 28 parts dry pyridine are added portionwise 8 parts dl - 1- (1 - phenyl - ethyl) - 5 - (chloro - carbonyl) - imidazole hydrochloride while stirring (exothermic reaction). After the addition is complete, the mixture is heated to reflux temperature and kept at this temperature for five minutes. After standing for 5 minutes more, the mixture is poured onto 500 parts ice water, whereupon an oil is precipitated which solidifies on scratching. This solid is filtered off and recrystallized from a mixture of benzene and petroleum ether, yielding dl - 1 - (1 - phenyl - ethyl) - 5-(2,5 - dichloro - anilino - carbonyl) - imidazole; M.P. 146–147° C.

EXAMPLE XII

To a solution of 3.2 parts 2-methyl-aniline in 28 parts dry pyridine are added 8 parts of dl-1-(1-phenyl-ethyl)-5-(chloro-carbonyl)-imidazole hydrochloride while stirring. The mixture is heated to reflux and kept at this temperature for about 5 minutes. After standing for an additional 5 minutes the mixture is poured onto 500 parts water, whereupon an oil is separated. After standing overnight at room temperature, a small percipitate is formed. The aqueous layer is decanted and the semi-solid residue solidifies on scratching. After recrystallization from a mixture of benzene and petroleum ether, dl-1-(1-phenyl-ethyl)-5-(2-methyl-anilino - carbonyl) - imidazole is obtained; M.P. 108–109.5° C.

EXAMPLE XIII

To a solution of 3.2 parts 3-methyl-aniline in 28 parts dry pyridine are added 8 parts dl-1-(1-phenyl-ethyl)-5-(chloro-carbonyl)-imidazole hydrochloride while stirring (exothermic reaction). After the addition is complete, the mixture is heated to reflux and this temperature is maintained for 5 minutes. After standing for an additional 5 minutes, the reaction mixture is poured onto 500 parts ice water. The separated oil is solidified by scratching. It is filtered off and recrystallized from a mixture of benzene and petroleum ether, yielding dl-1-(1-phenyl-ethyl-5-(3-methyl)-anilino - carbonyl) - imidazole; M.P. 161.5–163° C.

EXAMPLE XIV

To a solution of 3.5 parts 4-methyl-aniline in 28 parts dry pyridine is added 8.1 parts dl-1-(1-phenyl-ethyl)-5-(chloro-carbonyl)-imidazole hydrochloride. The mixture is brought to boil and is allowed to stand for 5 minutes. Then it is poured onto ice-water, yielding a solid product, which, after recrystallization from ethanol 50%, yields dl-1-(1-phenyl-ethyl) - 5 - (4-methyl-anilino-carbonyl)-imidazole; M.P. 186–187° C.

EXAMPLE XV

To a mixture of 4.5 parts 2-methoxy-aniline in 28 parts dry pyridine are added 8.1 parts dl-1-(1-phenyl-ethyl)-5-(chloro-carbonyl)-imidazole hydrochloride. The whole is brought to a quick boil and then allowed to stand for five minutes. After the reaction mixture is poured on water, a solid product is obtained. It is filtered off and recrystallized from a mixture of 40 parts benzene and 40 parts heptane, yielding, after drying for 15 hours at 90° C., dl-1-(1 - phenyl-ethyl)-5-(2-methoxy-anilino-carbonyl)-imidazole; M.P. 105–111° C. (dec.).

EXAMPLE XVI

To a solution of 4.5 parts 3-methoxy-aniline in 28 parts pyridine is added 8.1 parts dl-1-(1-phenyl-ethyl)-5-(chloro-carbonyl)-imidazole hydrochloride. After the addition is complete, the solution is brought to a quick boil and then allowed to stand for 5 minutes. The whole is poured on water giving first an oil which slowly solidifies. It is filtered off and recrystallized from a mixture of 40 parts benzene and 32 parts petroleum ether, yielding dl-1-(1-phenyl-ethyl)-5-(3-methoxy-anilino-carbonyl) - imidazole; M.P. 120–130° C.

EXAMPLE XVII

To a solution of 4.5 parts 4-methoxy-aniline in 28 parts pyridine is added 8.1 parts dl-1-(1-phenyl-ethyl)-5-(chloro-carbonyl)-imidazole hydrochloride. After the addition is complete, the mixture is brought to a quick boil and then allowed to stand for 5 minutes. The whole is poured on water to give a black oil which is rendered crystalline. The solid is recrystallized from a mixture of 40 parts benzene and 40 parts petroleum ether, to yield dl-1-(1-phenyl-ethyl)-5-(4-methoxy-anilino-carbonyl) - imidazole; M.P. 118–121° C.

EXAMPLE XVIII

To a solution of 4.1 parts 3-nitro-aniline in 28 parts pyridine are added 8 parts dl-1-(1-phenyl-ethyl)-5-(chloro - carbonyl) - imidazole hydrochloride while stirring (slightly exothermic reaction). After the addition is complete, the mixture is stirred and refluxed for 5 minutes. After standing for a few minutes, the mixture is poured into 500 parts water, whereupon an oil is separated, which solidifies on scratching. The solid matter is filtered off and recrystallized from a mixture of benzene, methanol and petroleum ether, to yield dl-1-(1-phenyl-ethyl)-5-(3-nitro-anilino-carbonyl)-imidazole; M.P. 162–164° C.

EXAMPLE XIX

To a solution of 4.1 parts 4-nitro-aniline in 28 parts pyridine are added portionwise 8 parts dl-1-(1-phenyl-ethyl)-5-(chloro-carbonyl) - imidazole hydrochloride while stirring. After the addition is complete the whole is further stirred and boiled for about 5 minutes. After standing for 5 minutes the mixture is poured into 500 parts water, whereupon an oil is separated, which solidifies on scratching. The solid is filtered off and recrystallized from ethanol, yielding dl-1-(1-phenyl-ethyl) - 5 - (4-nitro-anilino-carbonyl)-imidazole; M.P. 188–189° C.

EXAMPLE XX

To a solution of 3.21 parts N-methyl-aniline in 28 parts pyridine are added 8 parts dl-1-(1-phenyl-ethyl)-5-(chloro-carbonyl)-imidazole hydrochloride while stirring (slightly exothermic reaction). After the addition is complete, the whole is further stirred and boiled for 5 minutes. After standing for 5 minutes more, the mixture is poured into 500 parts water, whereupon an oil is separated which solidifies on scratching. The solid matter is filtered off and recrystallized from a mixture of benzene and petroleum ether, yielding dl-1-(1-phenyl-ethyl)-5-(N-methyl-anilino-carbonyl)-imidazole; M.P. 157–158° C.

EXAMPLE XXI

To a solution of 2.8 parts 3-amino-pyridine in 28 parts pyridine are added 8 parts dl-1-(1-phenyl-ethyl)-5-(chloro - carbonyl) - imidazole hydrochloride while stirring (slightly exothermic reaction). After the addition is complete, the whole is stirred and refluxed for about 5 minutes. After standing for 5 minutes more, the reaction mixture is poured into 500 parts water, whereupon an oil is separated which solidifies on scratching. The solid is filtered off and recrystallized from a mixture of benzene and petroleum ether, to yield dl-1-(1-phenyl-ethyl) - 5 - (3-pyridyl-amino-carbonyl)-imidazole; M.P. 131–131.5° C.

EXAMPLE XXII

To a solution of 5.4 parts 2,5-diethoxy-aniline in 28 parts dry pyridine are added 8 parts dl-1-(1-phenyl-ethyl)-5-(chloro-carbonyl) - imidazole hydrochloride while stirring (exothermic reaction). After the addition is complete, the mixture is heated to reflux temperature and kept at this temperature for 5 minutes. After standing for 5 minutes more, the reaction mixture is poured onto 500 parts ice-water, whereupon an oil is separated which solidifies on scratching. The solid is filtered off and recrystallized from a mixture of benzene and petroleum ether, yielding dl-1-(1-phenyl-ethyl) - 5 - (2,5-diethoxy-anilino-carbonyl)-imidazole; M.P. 123–129° C.

EXAMPLE XXIII

To a mixture of 132 parts dl-1-phenyl-ethylamine 110 parts triethylamine and 100 parts dimethylformamide are added 133.5 parts ethyl chloroacetate (exothermic reaction: temperature rises from 10° to 50° C.). After the addition is complete, the whole is stirred overnight at a temperature of 45° C. The reaction mixture is then diluted with 800 parts anhydrous ether, whereupon a precipitate is formed. It is filtered off (mainly triethylamine hydrochloride) and the filtrate is washed four times with water. The organic layer is dried over magnesium sulfate, filtered and evaporated, yielding dl-N-[(ethoxycarbonyl)-methyl]-1-phenyl-ethylamine as a residue. This product is heated to reflux together with 55.2 parts formic acid and 480 parts xylene. After the calculated amount of water and formic acid are separated, the mixture is cooled and extracted successively with water, formic acid 20%, water, a sodium hydrogen carbonate solution and again with water. The organic layer is then separated, dried over magnesium-sulfate, filtered and evaporated. The oily residue is distilled in vacuo, to yield dl-N-formyl-N-[(ethoxy-carbonyl)-methyl]-1-phenyl-ethylamine (B.P. 165–170° C. at 3 mm. pressure). 29.9 parts of a sodium dispersion 50% in paraffin oil are added to 300 parts tetrahydrofurane and the whole is slowly heated to a temperature of 40° C., while stirring. While maintaining this temperature, there is added a solution of 16 parts methanol and 75 parts tetrahydrofurane. After the addition is complete, the whole is stirred at 40° C. for 1 hour. After cooling to 10° C., there is added at once a mixture of 144 parts dl-N-formyl-N-[(ethoxycarbonyl)-methyl]-1-phenyl ethylamine in 108 parts methyl formate. The whole is stirred overnight at room temperature. The mixture is evaporated in vacuo. To the residue are added 800 parts ether followed by 700 parts water. The aqueous layer is separated and diluted to a volume of 1000 parts. Then there are added 114 parts concentrated hydrochloric acid. The whole is heated to 40° C. and stirred at this temperature for 15 minutes. Then there is added dropwise a solution of 90 parts potassium thiocyanate in an equal volume of water. After the addition is complete, the whole is further stirred for 3 hours at 40° C., followed by stirring overnight at room temperature. The methanol is distilled off and the oily residue solidifies on stirring. This solid is triturated in ice-cold methanol previously diluted with 15% water. The solid is filtered off, washed with diisopropylether and recrystallized once more from a mixture of methanol and water, treated with activated charcoal. After boiling for a few minutes, the whole is filtered hot and after cooling the filtrate for 3 hours at room temperature, the solid is filtered off yielding [dl-1-(1-phenyl-ethyl)-2-mercapto-5-(methoxy-carbonyl)-imidazole]; M.P. 131–134° C.

To a mixture of 80 parts nitric acid (d: 1.37) and 200 parts water are added 0.5 part sodium nitrite at a temperature of about 25° C. While keeping the temperature at about 35° C., there are added portionwise 66 parts dl-1-(1-phenyl-ethyl)-2-mercapto-5-(methoxy-carbonyl)-imidazole. After the addition is complete, the whole is cooled to room temperature. Then the solution is alkalized by addition of sodium carbonate while stirring. The mixture is extracted with ether. The organic layer is separated, dried over magnesium sulfate and filtered. To the filtrate is added 2-propanol, previously saturated with gaseous hydrogen chloride. The formed precipitate is filtered off and dissolved in boiling methanol. Anhydrous ether is added until a turbid solution is obtained and the whole is kept overnight at room temperature. Then the precipitate is filtered off and dried in vacuo, yielding dl-1-(1-phenyl-ethyl)-5-(methoxy-carbonyl)-imidazole hydrochloride; M.P. 173–174° C.

A mixture of 58 parts dl-1-(1-phenyl-ethyl)-5-(methoxy-carbnoyl)-imidazole hydrochloride and 557 parts concentrated hydrochloric acid is stirred and refluxed overnight. The reaction mixture is boiled with activated charcoal. The mixture is filtered and the filtrate is evaporated. The solid residue is washed with acetone and filtered off again. This product is dissolved in a small volume of water and the solution is alkalized with a concentrated sodium hydroxide solution; pH±7. The precipitate is washed with water, dried and recrystallized from 25 parts water. After keeping for 4 hours at room temperature, the solid is filtered off, washed with alcohol and ether, and dried in vacuo, yielding dl-1-(1-phenyl-ethyl)-5-carboxy-imidazole; M.P. 187–189° C.

A mixture of 64 parts of dl-1-(1-phenyl-ethyl)-5-carboxy-imidazole and 240 parts thionylchloride is stirred and refluxed for about 2 hours. After cooling there are added 500 parts diisopropylether, whereupon a solid precipitate is formed. It is filtered off and dried, yielding dl-1-(1-phenyl-ethyl)-5-(chloro-carbonyl)-imidazole hydrochloride; M.P. 161–263° C. (dec.).

What is claimed is:
1. 1-(1-phenyl-ethyl)-5-[(R)(Ar)N-CO]-imidazole wherein R is a member selected from the group consisting of hydrogen and lower alkyl, and Ar is a member selected from the group consisting of phenyl, halophenyl, lower alkylphenyl, lower alkoxyphenyl, nitrophenyl and pyridyl.
2. 1-(1-phenyl-ethyl)-5-(anilino-carbonyl)-imidazole.
3. 1-(1-phenyl-ethyl)-5-(4-fluoro-anilino-carbonyl)-imidazole.
4. 1-(1-phenyl-ethyl)-5-(2-chloro-anilino-carbonyl)-imidazole.
5. 1-(1phenyl-ethyl)-5-(3-chloro-anilino-carbonyl)-imidazole.
6. 1-(1-phenyl-ethyl)-5-(4-chloro-anilino-carbonyl)-imidazole.
7. 1-(1-phenyl-ethyl)-5-(3,4-dichloro-anilino-carbonyl)-imidazole.
8. 1-(1-phenyl-ethyl)-5-(2,5-dichloro-anilino-carbonyl)-imidazole.
9. 1-(1-phenyl-ethyl)-5-(2-methyl-anilino-carbonyl)-imidazole.
10. 1-(1-phenyl-ethyl)-5-(3-methyl-anilino-carbonyl)-imidazole.
11. 1-(1-phenyl-ethyl)-5-(4-methyl-anilino-carbonyl)-imidazole.
12. 1-(1-phenyl-ethyl)-5-(2-methoxy-anilino-carbonyl)-imidazole.
13. 1-(1-phenyl-ethyl)-5-(3-methoxy-anilino-carbonyl)-imidazole.
14. 1-(1-phenyl-ethyl)-5-(4-methoxy-anilino-carbonyl)-imidazole.
15. 1-(1-phenyl-ethyl)-5-(3-nitro-anilino-carbonyl)-imidazole.
16. 1-(1-phenyl-ethyl)-5-(4-nitro-anilino-carbonyl)-imidazole.
17. 1-(1-phenyl-ethyl)-5-(N-methyl-anilino-carbonyl)-imidazole.
18. 1-(1-phenyl-ethyl)-5-(3-pyridyl-amino-carbonyl)-imidazole.
19. 1-(1-phenyl-ethyl)-5-(2,5-diethoxy-anilino-carbonyl)-imidazole.

References Cited

Gompper et al.: Chemische Berichte, vol. 92; pp. 550–8 (1959).

JOHN D. RANDOLPH, *Primary Examiner.*

WALTER A. MODANCE, *Examiner.*

NATALIE TROUSOF, *Assistant Examiner.*